March 13, 1945. W. STRAUSS 2,371,195
AUTOMATIC MOLDING PRESS
Filed Aug. 12, 1942 4 Sheets-Sheet 1

Fig. 1.

Inventor
WILLIAM STRAUSS
By Ralph B. Stewart
Attorney

Patented Mar. 13, 1945

2,371,195

UNITED STATES PATENT OFFICE 2,371,195

AUTOMATIC MOLDING PRESS

William Strauss, Philadelphia, Pa., assignor to F. J. Stokes Machine Company, a corporation of Pennsylvania Application August 12, 1942, Serial No. 454,590

23 Claims. (Cl. 18—16)

This invention relates to molding presses, and in particular to arrangements for securing automatic operation of the press through a continuous succession of cycles and for stopping the press automatically in response to certain improper operation.

An object of the present invention is to devise a safety device for exploring the surface of the mold parts after each ejection operation and for stopping the press in the event that a molded piece remains on the mold part or parts.

A further object is to devise a novel control system for operating the press through a continuous succession of molding cycles.

A further object is to devise improved apparatus for unscrewing molded articles from threaded mold parts. The unscrewing is accomplished by rotating one mold part with respect to the other while the two mold parts are being separated. After the molded article has been separated from the unthreaded mold part and is still retained on the threaded mold part, the final unscrewing operation is completed by a wiper element which is moved into the space between the mold parts and engages the periphery of the molded article. The present invention provides novel power driven means for rotating the rotatable mold part and for adjusting the extent of rotation thereof to substantially unscrew the molded article from the threaded mold part, and to thereby limit the amount of unscrewing required by the wiper element. The present invention also involves novel control means for adjustably setting the rate of separation of the two mold parts during the unscrewing operation, and for thereafter separating the two mold parts at a faster rate.

Another object of the invention is to devise apparatus for unscrewing threaded articles from a threaded mold part by the use of a friction wiper bar engaging the periphery of the threaded article, the wiper being arranged so that it not only completes the unscrewing of the threaded article but also removes any flash which may be formed on the periphery of the article at the dividing plane of the mold. This object is accomplished by arranging the movable wiper bar to engage the molded article so that a portion of the wiper bar extends above the plane of the flash.

Still another object is to provide means for cleaning the die cavities and lower die parts after each molding operation. The lower die plate carrying the dies is mounted on a movable carriage and is moved out of the press after each molding operation into position under a loading device for loading new charges of material in the cavities. For cleaning the lower die plate, a jet pipe or manifold is arranged above the upper surface of the die plate and in front of the loading device to direct jets of air against the upper surface of the plate as the plate is moved towards the loading device. The air supply to the jet pipe is rendered effective by the outward movement of the die plate and is cut off by the return movement of the plate.

My invention is illustrated in the accompanying drawings in which.

Figure 1:
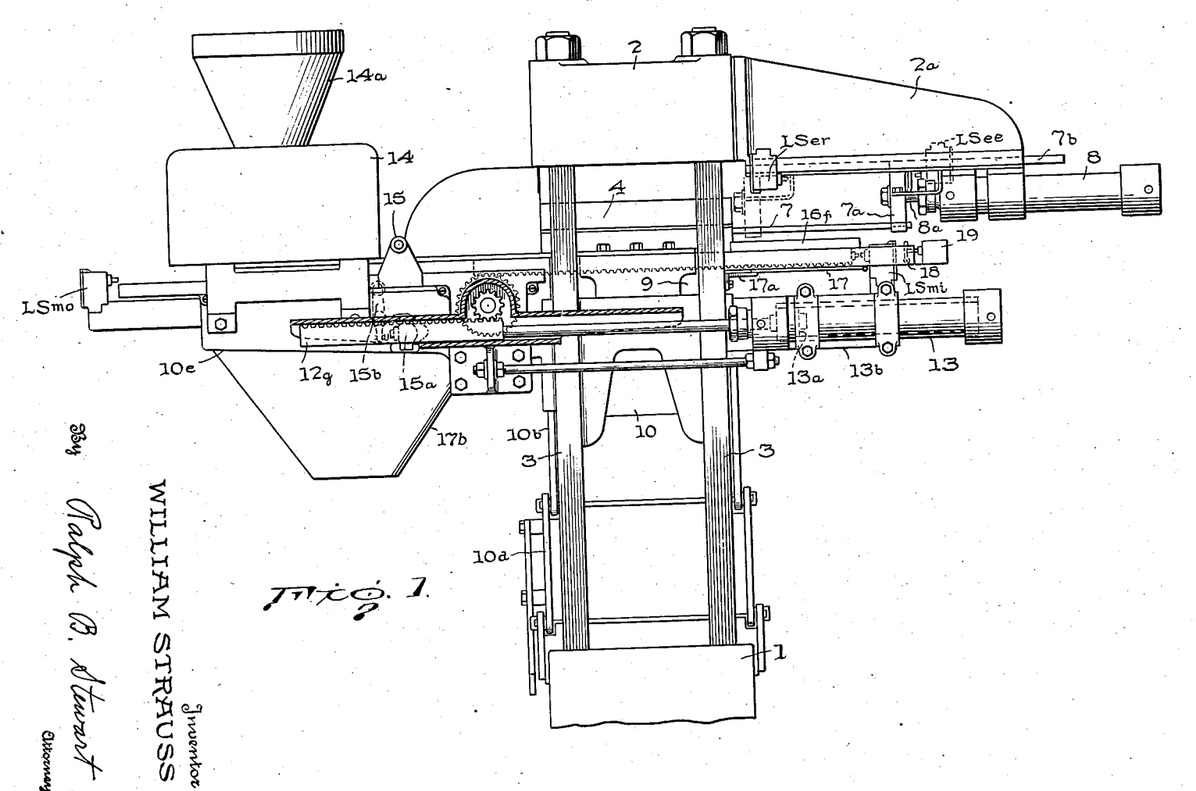
Figure 1 is a side elevational view of a press illustrating a preferred embodiment of the invention.
Figures 2, 3, 6, 7:
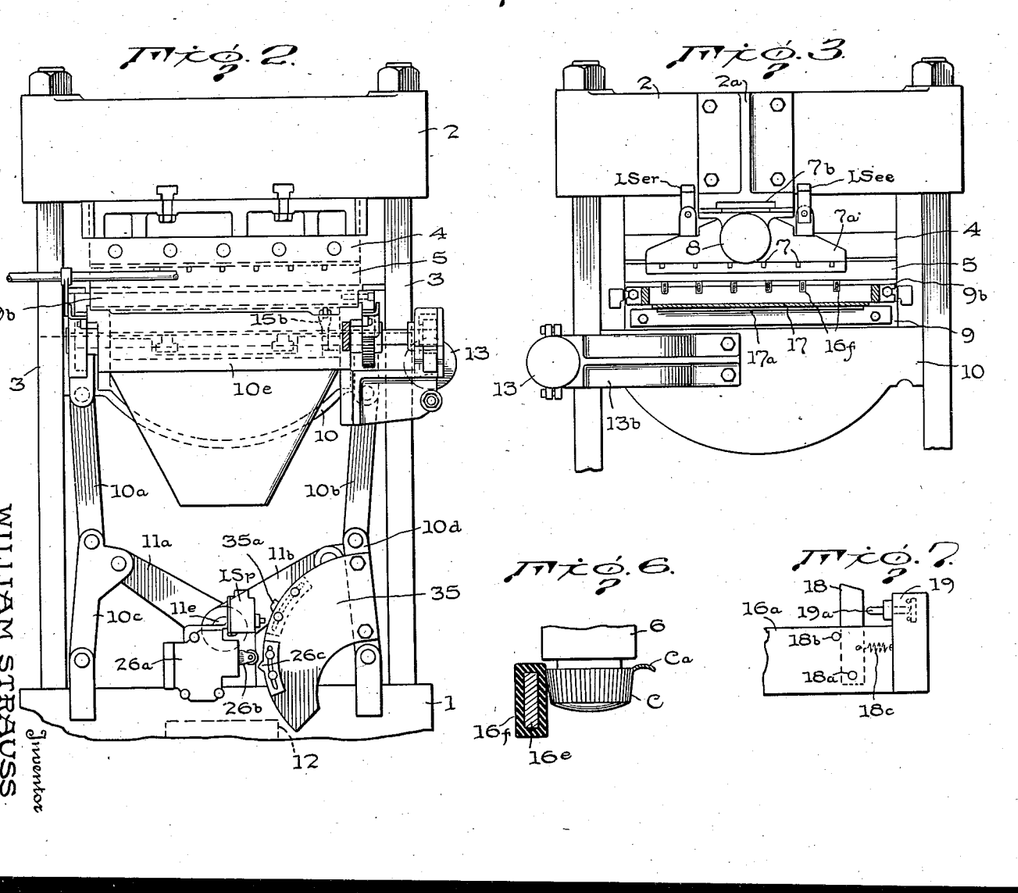
Figure 2 is a front view of the press shown in Figure 1 with the loading device removed.
Figure 3 is a fragmentary rear view showing the upper part of the press in elevation.
Figure 6 is an enlarged view showing the manner in which the friction wiper bar engages the periphery of a molded article to simultaneously remove the flash from the article and unscrew the same from the force.
Figure 7 is an enlarged fragmentary view showing the feeler or stripper bar mounted at the rear of the wiper frame.
Figure 4:
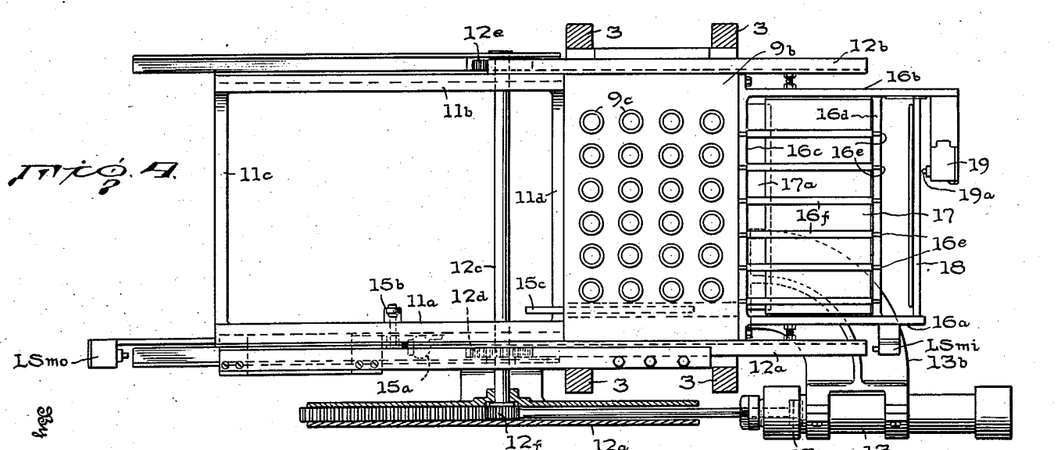
Figure 4 is a sectional view of Figure 1 taken along the line 4—4.
Figure 5:
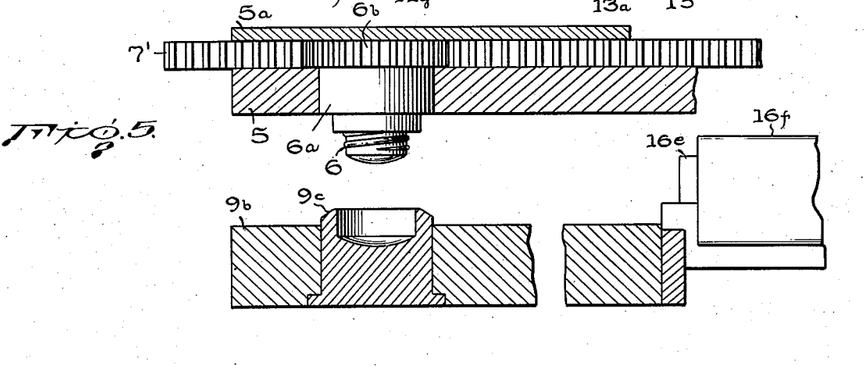
Figure 5 is an enlarged fragmentary view showing the upper and lower die plates in section in a vertical plane passing through the center of one of the die cavities, the threaded force and the rack for operating the same being shown in elevation.

Referring to the drawings, the various features of the present invention have been shown embodied in a hydraulic press, but it will be understood that certain features are not limited to use in hydraulic presses but are useful in mechanical and other types of presses. In the drawings, the press is formed of a main frame consisting of a base 1 and a head 2 supported above the base by four tie-rods 3 which also serve as vertical guides for the movable platen of the press. An upper platen 4 is secured to the underside of head 2 and is suitably heated if required. An upper die plate 5 is secured to the lower face of platen 4, and a plurality of threaded forces 6 having cylindrical stems 6a are rotatably mounted in holes formed in plate 5, the upper ends of each force being provided with a pinion gear of larger diameter than the stem 6a. As will be understood, the forces are arranged in a number of parallel rows. A plurality of racks 7 are positioned in a plurality of slots formed in the upper face of plate 5 parallel to the rows of forces 6, one rack being provided for each row of forces and is arranged to engage the pinions 6b on all forces in the row. A cover plate 5a is secured to the top of plate 5 and serves to retain the rotary forces 6 and slideable racks 7 in position on the plate 5. As shown in Figures 1 and 3, the ends of racks 7 are secured to a crosshead 7a which is mounted for reciprocation parallel to the axis of racks 7. Preferably the crosshead 7a is supported from a slide 7b carried by bracket 2a mounted on head 2. Crosshead 7a is reciprocated by a piston mounted in cylinder 8 carried by bracket 2a. Cylinder 8 is designed so that its full stroke produces a maximum rotation of forces 6 for a press of certain capacity, and the amount of rotation required for any particular molded article may be secured by limiting the stroke of the piston in cylinder 8 in any suitable manner. One satisfactory arrangement is to insert a split sleeve 8a on the piston rod between crosshead 7a and the front end of cylinder 8. By substituting sleeves of different lengths, the stroke of the piston may be limited to any desired value. It is also obvious that other devices may be employed for limiting the stroke of the crosshead 7a, such as adjustable stops clamped on the lower horizontal part of bracket 2a.

A lower heated platen 9 is carried by a table 10 which is mounted for vertical movement below die plate 5 and is guided by tie-rods 3. Table 10 may be reciprocated vertically by any suitable power means, but in the arrangement illustrated, the table is mounted upon a pair of toggle constructions formed of upper links 10a and 10b and lower links 10c and 10d. The two toggle arrangements are operated by a pair of links 11a and 11b connecting the toggles with a pivot shaft 11c which is reciprocated vertically by a piston mounted in a pressure cylinder 12 located in the base 1. A lower die plate 9b is positioned on the upper face of lower platen 9 and carries a plurality of die elements 9c having mold cavities formed therein and arranged to cooperate with forces 6 in forming internally threaded closure caps. Preferably the vertical walls of the die cavity would be fluted or otherwise formed to provide interlocking engagement between the molded part and the die part 9c to prevent rotation of the molded article therein but permitting stripping of the article therefrom by separation of the force plug 6 from the die parts 9c.

In Figure 1 crosshead 7a is shown in its extreme right-hand position. The normal position of the crosshead is indicated in dotted lines, and it remains in this position during the molding operation. In moving from the dotted position to the full line position shown in Figure 1, crosshead 7a operates racks 7 to rotate forces 6 in a direction to unscrew the molded articles from the forces. Movement of crosshead 7 is stopped by the sleeve 8a just short of completely unscrewing the caps from the forces. It will be understood that the lower platen 9 is being lowered simultaneously with the rotation of forces 6.

Die plate 9b is not secured to platen 9 but is mounted to be moved in and out of the press on a guide structure formed in part by a rectangular frame-like bracket which is secured to and carried by table 10. This table extension or bracket is formed of two parallel side walls 11a and 11b joined at their ends by transverse walls 11c and 11d. The bracket is mounted with the upper faces of side walls 11a and 11b in the same plane with the upper face of heated platen 9, and the upper surfaces of side walls 11a and 11b form parallel track elements for supporting the lower die plate 9b when it is moved out of the press. To facilitate movement of the die plate out of the press, a pair of racks 12a and 12b are secured to opposite sides of lower die plate 9b and are movable therewith. Racks 12a and 12b constitute a movable carriage for the die plate. A shaft 12c is suitably journaled on bracket 11a—11b transversely of the bracket below the racks 12a and 12b, and a pair of pinions 12d and 12e are secured to the shaft 12c and engage racks 12a and 12b respectively. The outer end of shaft 12c is provided with a pinion 12f which engages rack 12g mounted in a suitable guide structure for reciprocation to rotate the shaft 12c. Rack 12g is reciprocated by a piston 13a operating in pressure cylinder 13 supported on a bracket 13b which in turn is supported on vertically movable table 10. Preferably the pinion 12f is of smaller diameter than pinions 12d and 12e so that a given movement of rack 12g produces a greater movement of die plate 9b, for example, pinion 12f may have a diameter equal to one-half the diameter of pinions 12d and 12e. Piston 13a and rack 12g are shown in their normal position with the die plate 10b in its normal position in the press. When cylinder 13 is energized to operate piston 13a to the right, die plate 9b is moved out of the press and into position under a loading device 14 mounted on bracket 11a—11b.

The loading device 14 may be of any suitable construction for depositing molding material in the die cavities on plate 9b when the plate comes into position under the loading device. Devices of this type are known and need not be described in detail. It is sufficient to state that the device would involve a hopper or storage container 14a for receiving molding material, either in powdered form or as preforms, and the device would also involve a suitable release, operated by movement of the die plate into position under the loading device, for releasing the proper charges into the die cavities.

For the purpose of cleaning the die cavities of excess molding material, flash, or other loose material, I arrange a jet pipe 15 transversely of the bracket 11a—11b and above the path of travel of die plate 9b. The pipe 15 is provided with suitable air holes along its length for directing air blasts downwardly and forwardly against the upper surface of the oncoming die plate as the plate is being moved out of the press and into position under the loading device. Jet pipe 15 is provided with a connection to a suitable source of compressed air, the connection including a spring biased cut-off valve 15a carried by bracket wall 11a. Valve 15a is normally closed to cut off the supply of air to pipe 15. A tiltable control lever 15b is pivotally supported on bracket 11a, and the upper end of this lever is mounted in the path of movement of a cam strip 15c mounted for movement with die plate 9b as it is moved out of the press. In the normal vertical position of the control element 15b, the valve 15a is closed, but when the die plate 9b is moved out of the press, cam strip 15c tilts lever 15b to the left and opens the valve 15a to admit air to pipe 15 at the time when the front edge of the plate 9b is in a position to pass under the pipe 15. The cam strip 15c maintains the valve 15a open until the plate has passed beyond the pipe 15, and then the lever 15b rides off of the cam strip 15c and returns to its vertical position. On the return movement of die plate 9b, cam strip 15c operates control lever 15b to the right, but this movement of the lever does not affect the valve 15a which remains closed until the die plate is moved out again. A horizontal rectangular frame having two side walls 16a and 16b, and two transverse walls 16c and 16d is suitably secured to the rear edge of die plate 9b, although this frame might be secured to racks 12a and 12b. Preferably, this frame is fastened into position by securing means which will permit adjustment of the frame in a vertical direction with respect to the die plate 9b. A number of friction wiper bars 16e are mounted between transverse walls 16c and 16d in parallel arrangement and slightly displaced with respect to the rows of die cavities formed in die elements 9c. The stripper bars 16e are preferably provided with rubber sleeves 16f throughout their effective length to increase the friction between the wiper bars and the molded article. As will be seen, one friction bar is provided for each row of die elements 9c carried by plate 9b, and the bars are positioned so that, as the die plate 9b is moved out of the press, one side of each bar will engage the outer periphery of the molded screw cap carried by each force 6 in the row associated with the bar. As the bar moves forward, the friction between the rubber covering on the bar and the molded article will cause the article to rotate in a direction to complete the unscrewing operation. Preferably, as shown in Figure 6, the stripper bars are so mounted that when the press is fully open, the bars will engage the molded articles at the dividing plane of the article (here shown as a screw-cap C) and will serve to break away the flash flange Ca which may be adhering to the article at the mold-dividing plane. If the flash is not removed, there is likelihood that articles which carry an unusually large flange of flash will become lodged between adjacent wiper bars and will not be properly discharged from the press.

As the articles are unscrewed from forces 6, they drop down between the wiper bars and are retained on a tray 17 which is pivotally supported at its rear edge to transverse frame member 16d. The front edge of the plate 17 normally rests upon a ledge 17a carried by either platen 9 or table 10. As die plate 9b is moved forward, tray 17 is maintained in horizontal position by the fact that the front edge of the tray is supported on the upper surface of platen 9. As the die plate 9b continues to move forward, the front edge of tray 17 passes beyond the left edge of platen 9, and from this point on the tray is supported at the left edge of platen 9. When the rear pivoted edge of tray 17 approaches the left edge of platen 9, the tray 17 tilts downwardly to discharge the molded articles into chute 17b carried by front bracket 11a—11b. Chute 17b directs the molded articles into a suitable container not shown. As the die plate 9b is returned to its normal position, the pivoted tray 17 will also be forced back into its horizontal or normal position by engagement with the front edge of platen 9. It will be understood that a separate guide element may be positioned in front of platen 9 beneath tray 17 for determining the position at which the tray will tilt downwardly to discharge the articles therefrom.

The side members 16a and 16b of the frame carrying friction bars 16f are extended to the rear, and a stripper, scraper or feeler bar 18 is pivotally mounted transversely of the frame between these extensions. The upper edge of the bar is located at an elevation which permits the bar to pass beneath the forces 6 with a small clearance between the bar and the lower end of the forces. The bar is pivoted at each end near the lower edge thereof as shown at 18a, and is urged forward against a fixed stop 18b by a suitable biasing spring 18c. A normally closed switch 19 is carried by frame member 16b in a position behind stripper bar 18, and the operating plunger 19a of switch 19 is positioned to be operated by the bar 18 in case the bar comes into contact with a molded article which may be sticking on one of the forces.

Figures 8, 8A:
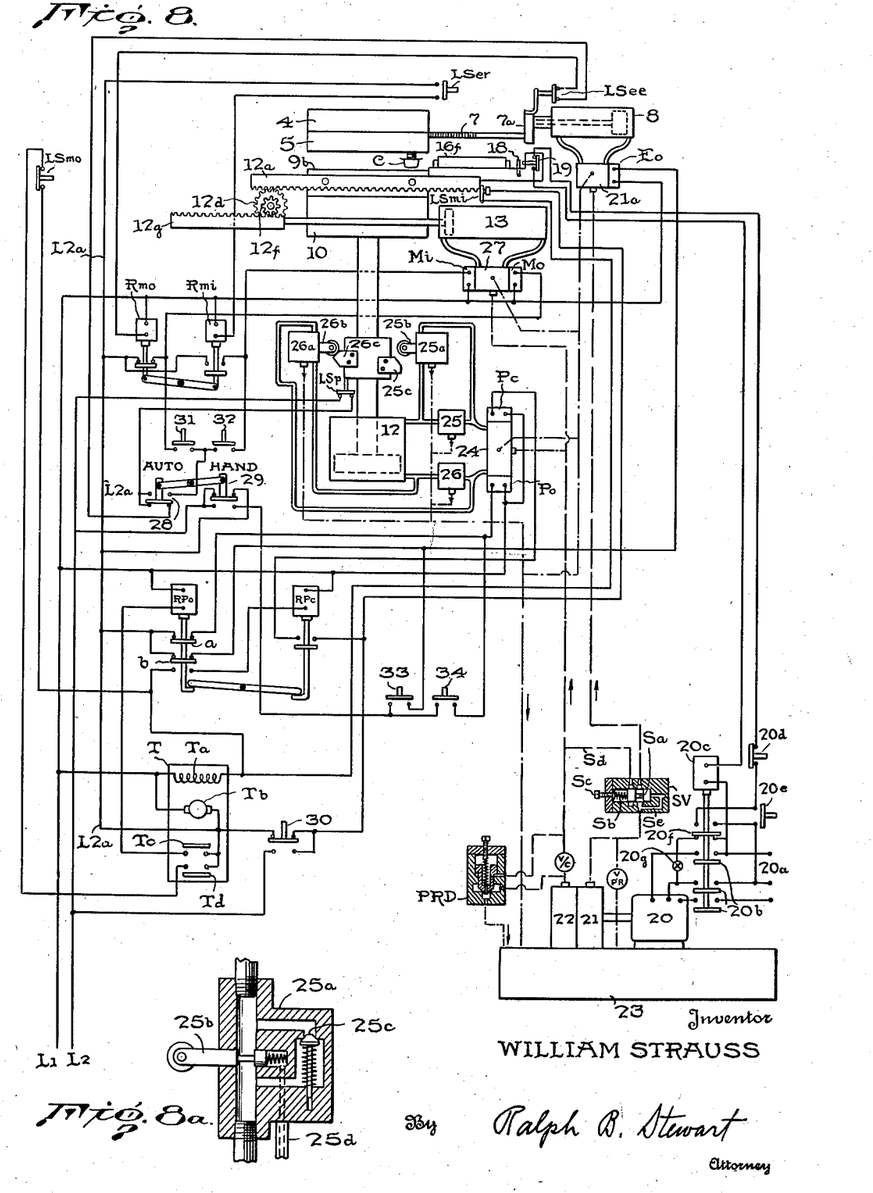
Figure 8 is a schematic diagram illustrating the hydraulic and electric systems for operating and controlling the press either automatically or manually.
Figure 8a is a sectional view of one of the control valves used in Figure 8.

In Figure 8 is a schematic diagram showing the hydraulic system for operating the various pressure cylinders and also showing the wiring diagram of the electric control system for securing automatic operation of the press. In the example illustrated, the source of power is an electric motor 20 supplied from a circuit 20a controlled by contacts 20b on relay 20c. Preferably a polyphase motor and circuit is employed. The energizing circuit for relay 20c extends from one conductor of circuit 20a through the relay, through switch 19 associated with the stripper bar 18, through "stop" push-button 20d, and through "start" push-button 20e back to another conductor of the supply circuit. Upon operating push-button 20e, relay 20c is energized to close the circuit to motor 20. Contact 20f on relay 20c closes a holding circuit for the relay in its upper position, and in its lower position it closes a circuit to energize a signal lamp 20g.

Motor 20 drives a high pressure pump 21 and a low pressure pump 22, the two pumps having intakes connected with the supply tank 23 containing a suitable liquid, such as oil. High pressure pump 21 supplies fluid (oil) under pressure to ejector cylinder 8 through an electrically controlled valve 21a having a winding Eo. This valve is normally spring biased to a position to maintain the crosshead 7a in the dotted line position shown in Figure 1, and when the valve winding is energized, the crosshead is operated to the position shown in full lines in Figure 1. Low pressure pump 22 supplies fluid under pressure to the main press cylinder 12 through an electrically controlled valve 24 having an "opening" winding Po and a "closing" winding Pc. For the sake of simplified showing, the table 10 of the press has been shown in Figure 8 as being operated directly by the piston in pressure cylinder 12. The "opening" connection from valve 24 to cylinder 12 includes an adjustable metering or throttling valve 25, and the "closing" connection from valve 24 to cylinder 12 includes a similar valve 26. The valve 25 is by-passed by a connection including a normally open shut-off valve 25a provided with an operating plunger 25b arranged in the path of travel of an adjustable cam element 25c carried by a movable part of the press and adapted to engage and operate the plunger 25b to cut off the flow through valve 25a as the press approaches its closed position. Throttling valve 26 is also by-passed by a connection including a normally open shut-off valve 26a having an operating plunger 26b arranged in the path of travel of an adjustable cam element 26c mounted on a part of the press operating mechanism and arranged to shut off fluid through valve 26a as the press begins to open. Figure 8a shows the internal construction of shut-off valve 25a; valve 26a has a similar construction. Plunger 25b is normally held in a position to permit free flow of fluid through the main passage, but flow in the main passage is cut off when the plunger is pushed in. An auxiliary passage is shunted around plunger 25b and includes a spring-pressed check valve 25c which permits fluid to flow downwardly through the valve regardless of the position of plunger 25b. The spring retaining cavity for plunger 25b is drained by conduit 25d. Low pressure pump 22 also supplies fluid under pressure to the mold transfer cylinder 13 through valve 27 which is provided with a winding Mo for controlling cylinder 13 to move the mold out of the press, and a winding Mi to move the mold back into the press. In Figure 8 the pressure pipe connections are shown in broken lines, while the drain or return connections for the various valves are represented in dot-dash lines.

The supply line to ejector cylinder 8 includes a sequence valve SV which has a plunger valve Sa normally urged to the right by spring Sb under a pressure which is adjustable by screw Sc. In the biased position of plunger Sa, high pressure fluid is supplied to the ejector valve 21a but the conduit Sd leading to the line which supplies fluid to main cylinder 12 and to transfer cylinder 13 is closed. An internal passage Se in the sequence valve supplies high pressure fluid to the rear end of plunger Sa and forces the plunger to the left when the pressure reaches a certain amount, thereby admitting high pressure fluid to the supply line for cylinders 12 and 13 as well as to the line for cylinder 8. A check valve VC prevents the high pressure fluid from entering low pressure pump 22. A pressure responsive low pressure pump unloading valve VPR prevents excessive pressures in the high pressure outlet of pump 21 and provides a drain back to tank 23 for pressures above a certain limit. A valve PRD responds to high pressure fluid in the supply line for cylinders 12 and 13 and opens a "dumping" or drain connection from the outlet of low pressure pump 22 back to the tank 23; this valve may be embodied in the construction of pump 22. From the foregoing it will be clear that on the opening stroke of the cylinder 12, fluid is freely admitted to the cylinder throughout the stroke, and the flow out of the cylinder is also unrestricted except when by-pass valve 26a is closed and at this time the out flow is restricted to the flow through valve 26. In the same way, on the closing stroke the "in flow" is unrestricted for the entire stroke, and the "out flow" is unrestricted except when by-pass valve 25a is closed.

The supply conductors for the electric control system are represented at L1 and L2. Supply conductor L1 is directly connected to one terminal of clutch coil Ta and the motor Tb of a timer T which controls the time the press remains in closed position for curing the molded articles. A relay Rpo is provided with contacts a and b which control the energizing circuits of winding Po on valve 24 and winding Eo on valve 21a. A relay Rpc controls the energizing circuit of winding Pc on valve 24, and these two relays are mechanically interlocked to prevent simultaneous operation of windings Pc and Po. The energizing circuit of relay Rpc also includes normally closed contact b on relay Rpo. The operating winding of relays Rpo, Ppc and valve operating windings Po, Pc and Eo are all directly connected to supply conductor L1. A relay Rmo is provided to control the circuit of winding Mo on valve 27, and a relay Rmi controls the circuit of valve winding Mi, these two relays being mechanically interlocked to prevent simultaneous energization of the two windings. The operating windings of relays Rmo and Rmi, as well as windings Mo and Mi are directly connected to supply conductor L1.

The return connections for the various relays and valve windings back to supply conductor L2 may be completed for automatic operation or for hand operation. For this purpose, two interlocked push buttons 28 and 29 are provided, the button 28 being pressed for automatic operation, and button 29 being pressed for hand operation. In the position of the buttons shown in Figure 8, for automatic operation, button 28 completes the supply circuit for relay Rmo through a limit switch LSee which is operated to closed position by crosshead 7a when the crosshead reaches its righthand position, and the circuit of Rmo also includes limit switch Lsp positioned to be operated to closed position by the press when it is fully open. Button 29 completes a connection between supply conductor L2 and an extension conductor L2a which is directly connected to the return terminals of timer motor Tb. The return circuit of timer clutch coil Ta is completed to conductor L2a by two alternative paths, one of which includes a normally closed limit switch LSmo, through the normally open contact Td in timer T to L2a. The alternative return circuit for winding Ta is through normally open limit switch LSmi and through the normally closed contact of push button 30 back to L2a. Limit switch LSmo is located in a position to be opened by rack 12a (or some other movable part) when die plate 9b comes into proper position under the loading device 14, and limit switch LSmi is positioned to be closed by rack 12a (or by some other movable part) when the die plate 9b is in proper position in the press. The return connection for relay Rpc is completed over two alternative paths corresponding to the paths traced above for timer clutch winding Ta, the only difference being that the circuit of this relay winding also includes the normally closed contact b on relay Rpo.

Operation of the timer T is as follows: Contacts Tc and Td are normally open when clutch coil Ta is de-energized. Energizing coil Ta closes contact Td and holds this contact closed so long as the coil is energized. As soon as coil Ta is energized, the timer starts counting off time, and at the end of a set time, the timer closes contact Tc which remains closed while coil Ta is energized. When coil Ta is de-energized, contacts Tc and Td open and the timer resets itself for another operation.

The return connections for the windings of relays Rpo, Rmi, and for valve windings Po, Eo, Pc, Mo and Mi are all completed to extension conductor L2a as follows: relay Rpo, through normally open contact Tc on timer T; relay Rmi, through normally open limit switch LSer, positioned to be operated to closed position by crosshead 7a when in its lefthand position; winding Po, through normally open contact a on relay Rpo; winding Eo, through the normally open contacts controlled by contact b on relay Rpo; winding Pc, through the normally open contacts on relay Rpc, and through the normally closed contacts on push-button 30; winding Mo, through the normally open contact controlled by relay Rmo; winding Mi, through the normally open contact controlled by relay Rmi.

If it is desired to secure hand operation of the press, push-button 29 is depressed, and this disconnects the circuit through push-button 28 to relay Rmo, and also disconnects the connection through push-button 29 to extension conductor L2a. For manual closing of the press, push button 30, when depressed, completes the return circuit for relay Rpc to supply conductor L2 instead of to extension conductor L2a. Push-button 28 completes a connection to push-buttons 31 and 32 which in turn control the circuits of valve windings Mo and Mi respectively and independently of relays Rmo and Rmi. Push button 31 effects movement of the mold out of the press, while button 32 effects movement of the mold into the press. Push-button 29 in its lower position completes a connection to another pair of normally open push buttons 33 and 34. Button 33 controls valve winding Eo independently of relay Rpo to operate ejector crosshead 7a to effect unscrewing of the molded articles from the forces. Button 34 controls the circuit of the valve winding Po independently of the relay Rpo to cause opening of the press.

Operation of the press is as follows, referring to Figure 8:

Assume that a charge of molding material is being compressed and cured in the press. At the end of the curing time, normally open timer contact Tc closes and energizes relay Rpo which in turn energizes opening magnet Po and ejector magnet Eo. Timer clutch coil Ta remains energized and holds contact Td closed. Ejector cylinder 8 and opening cylinder 12 operate simultaneously to rotate the force plugs and to separate the two die plates. As the lower platen moves downwardly, cam element 26c operates by-pass valve 26a and restricts the flow of fluid out of the lower end of cylinder 12 and thereby regulates the downward movement of the lower platen to secure the proper speed of separation of the two mold parts with respect to the speed of rotation of the forces by rack 7. The speed of separation is controlled so that crosshead 7a completes its full stroke before the lower die elements move out of interlocking engagement with the molded articles. Furthermore, the extent of movement of crosshead 7a is regulated by the length of stop collar 8a so that the threaded engagement of the articles on the forces at the end of the stroke of the crosshead is just sufficient to retain the caps on the forces. After cam 26c passes plunger 26b of valve 26a, the lower platen travels downwardly at a higher rate.

Low pressure pump 22 has a greater pumping capacity than high pressure pump 21, and this pump normally supplies cylinders 12 and 13 to operate the cylinders at a relatively high rate except after sequence valve SV has been operated to connect in pump 21 and pressure in these cylinders has built up above the setting of low pressure pump unloading valve PRD. The low pressure is then by-passed without resistance directly to tank 23. Normally the pump 22 would be set for operation at, say, 200 pounds pressure, while sequence valve SV would be set to connect in pump 21 when the pressure in the rack cylinder supply line reaches above 600 pounds pressure per square inch. The sequence valve remains in its biased position when the ejector is moving from one position to another, but when the ejector reaches one of its end positions, pressure builds up in the sequence valve and causes it to operate and connect pump 21 to the supply line for cylinders 12 and 13.

When the ejector crosshead 7a reaches the position shown in Figure 8, it closes limit switch LSee, and as soon as the press is fully open and limit switch LSp is closed, a circuit is closed through these two limit switches to energize relay Rmo which operates and energizes valve winding Mo, thus operating pressure cylinder 13 in a direction to move the mold out of the press and under the loading device 14. As the mold carriage is moved out of the press, the friction bars 16f engage the molded articles and complete the unscrewing of the articles from the forces as explained above.

As soon as the mold reaches its loading position, limit switch LSmo is opened by the movable carriage of the mold, and this opens the circuit of clutch winding Ta, thereby releasing contacts Tc and Td and resetting the timer T. Opening of timer contact Tc de-energizes relay Rpo which drops out, and its contact b prepares a circuit for energizing relay Rpc. The opening of relay Rpo also de-energizes ejector valve magnet Eo, and this valve returns under its spring bias to a position to operate ejector crosshead 7a back to its normal position. As soon as crosshead 7a returns to its normal position, it closes limit switch LSer which energizes relay Rmi which in turn energizes valve magnet Mi, thus operating pressure cylinder 13 to move the mold back into the press. As soon as the mold reaches its proper position in the press, limit switch LSmi is closed by the mold carriage, and this switch completes a circuit through clutch winding Ta on timer T and starts the timer in operation, closing contact Td and counting off the time for the later closure of contact Tc. The closure of limit switch LSmi completes the circuit for energizing relay Rpc which in turn energizes the press closing magnet Pc of valve 24, thus operating pressure cylinder 12 in a direction to close the press. The lower platen moves upwardly at a relatively high rate until cam element 25c engages plunger 25b of by-pass valve 25a and restricts the flow of fluid out of cylinder 12, thereby reducing the speed of closure of the press as the two mold plates approach each other. The press remains closed under the pressure of cylinder 12 until timer T has counted off the required curing time and closes contact Tc. From this point, another molding cycle continues as described above.

The manner in which the molded articles are discharged from the press into the chute 17b has been described above. It has also been indicated that as the lower die plate is moved out of the press, air manifold 15 is operated to clean the die cavities and the upper surface of the lower die plate of flash and other loose material.

In the normal operation of the press, the switch 19 associated with feeler or stripper bar 18 remains closed, but in the event that a molded article or a quantity of molding material should stick to any of the force plugs and project beyond the ends of these plugs, the bar 18 will open the switch 19 and thereby stop the motor 20 and energize the signal lamp 20g. This results in stopping of the operation of the press until an attendant discovers and remedies the cause of the improper operation. It will be understood that bar 18 will serve to strip any article or other material which is weakly adhering to the upper die parts, and the bar will function to stop the press only where the adhering parts establish enough resistance to movement of the bar to compress the spring 18c and tilt the bar backwards. Suitable means may be provided to adjust the face of biasing spring 18c.

It will be obvious that the stripper or feeler bar 18 is useful for checking the improper operation of the molding press for molding articles of various types and is not limited to screw threaded articles requiring friction or wiper bars. Also, the feeler bar may be applied to a molding press of the type where the lower platen remains in the press and is loaded by a reciprocating loading board. In this case, the feeler bar would be mounted on a movable carriage formed in part by racks 12a and 12b, the carriage being reciprocated by the same arrangement described herein. The loading board may also be mounted on the same carriage to the rear of the feeler bar, in which case the loading device would be positioned on the opposite side of the press from the position shown in the drawings and in a position to fill the loading board when it is moved out of the press.

The control valves 25a and 26a, and limit switch LSp, diagrammatically represented in Figure 8, may be mounted in any suitable manner for operation by the opening and closing movement of the press, and one suitable arrangement is shown in Figure 2 where cam element 26c for operating valve 26a is adjustably mounted upon a sector plate 35 secured to and movable with one of the toggle links 10d. An adjustable cam element 35a may also be mounted on plate 35 for operating the limit switch LSp.

While I have shown and described a preferred arrangement of a press and its control system embodying the various features of my invention and illustrating the principle of operation thereof, it will be obvious that other embodiments may be devised for accomplishing the same objects.

What I claim is:
1. A machine for molding threaded articles from plastic material comprising, in combination, a pair of separable mold parts, one of said parts having screw-threads formed thereon and the other part being unthreaded, means for separating said mold parts to strip the molded article from said unthreaded mold part, adjustable means, operative during the initial separating movement, for fixing the speed of separation of said mold parts at a predetermined speed, means rendered operative after a predetermined separation of said mold parts to increase the speed of separation, means for rotating one of said mold parts to unscrew the threaded article from said threaded mold part, and means for energizing said rotating means in timed relation with said separating means to cause operation of said rotating means during the range of the lower speed of separation of said mold parts.

2. A machine according to claim 1 wherein said speed fixing means is controlled by the opening movement of said movable mold part.

3. A machine according to claim 1 wherein said means for separating said mold parts includes a pressure cylinder supplied with fluid under pressure for operating the movable mold part, and including a valve in the fluid supply for said cylinder and a cam operated by the initial range of movement of said movable mold part for controlling said valve to restrict the rate of fluid supplied to said cylinder.

4. A machine according to claim 1 wherein said means for rotating said rotatable mold part includes an adjustable stop for limiting the amount of rotation of said rotatable mold part to prevent complete unscrewing of the molded article from said threaded mold part.

5. A machine for molding articles from plastic molding material comprising, in combination, a press having two cooperating mold parts, one of said parts being movable to open and close the mold and at least one mold part being fixed against movement transversely of the press, operating means for operating said movable part to open and close said mold in a succession of cycles, a feeler element mounted for movement transversely of the press to explore the face of said fixed mold part, means operable in timed relation with said movable part for moving said feeler element to explore said fixed mold part when the mold is open, and means controlled by engagement of said feeler element with a molded article retained on said mold part for stopping said operating means.

6. A machine for molding articles from plastic molding material comprising, in combination, a press having relatively movable platens, cooperating mold parts carried by said platens, at least one of said mold parts being fixed against movement transversely of the press, operating means for operating one of said platens to open and close the mold in a succession of cycles, a movable carriage mounted for movement transversely of the press and into the space between said platens when said mold is open, a feeler element carried by said movable carriage and arranged to explore the face of said fixed mold part positioned within said press when said carriage is moved between said platens, means operable in timed relation with said movable platen for moving said carriage between said platens when said mold is open, and means controlled by engagement of said feeler element with material retained on said mold part for stopping said operating means.

7. A machine for molding plastic articles comprising, in combination, a press having a die plate supported therein, a loading device mounted adjacent said press, means for transferring said die plate from said press into loading position in said loading device, an air manifold located between said press and said loading device and arranged to direct air jets against the upper face of said die plate as said plate is moved into said loading device, a source of air for said manifold, and means controlled by movement of said die plate for admitting air to said manifold on the outward movement of said plate and for cutting off the air on the return movement of said plate.

8. A machine for molding articles from plastic molding material comprising, in combination, a pair of separable mold parts, one of said parts having a threaded portion for forming screw threads on the molded article, and one of said parts being movable to open and close the mold, a reciprocatable wiper bar mounted for movement adjacent said threaded mold portion and being positioned to frictionally engage the molded article and rotate the same in a direction to unscrew said article from said threaded mold portion, said wiper bar being positioned to engage and remove the flash flange formed on said article at the mold-dividing plane.

9. A machine for molding threaded articles from plastic material comprising, in combination, a pair of separable mold parts, one of said mold parts having a die cavity formed therein and the other mold part having a rotatable threaded force positioned to enter said die cavity, means for separating said mold parts to strip the molded article from said cavity, means for rotating said force in a direction to unscrew the threaded article therefrom, means for timing the operation of said separating means and said rotating means to initiate the rotation of said force prior to removal of said article from said cavity, a stop for stopping the rotation of said force before the article has been completely unscrewed therefrom, a movable carriage mounted for movement transversely of the axis of said force and adjacent thereto, a wiper bar mounted on said movable carriage and positioned to frictionally engage the molded article and rotate the same to completely unscrew the article from said force, said wiper bar being positioned to extend above and below the mold dividing plane on said article and to thereby destroy the flash flange formed on the article, a scraper element mounted on the rear of said movable carriage and positioned to pass the end of said force with a small clearance, biasing means for normally holding said scraper element in scraping position and permitting movement of the element from its normal position when the resistance to movement thereof exceeds a predetermined amount, power means for moving said movable carriage past said force in timed relation with the separation of said mold parts, and means controlled by movement of said scraper element from its normal position for stopping the operation of said power means.

10. A machine for molding articles comprising, in combination, a press having upper and lower mold parts supported therein including means for separating said mold parts, a loading device mounted adjacent said press, means for transferring the lower mold part from said press into loading position in said loading device, an air manifold located between said press and said loading device and arranged to direct air jets against the upper surface of said lower mold part as said part is moved into said loading device, means controlled by movement of said lower mold part for supplying air to said manifold on the outward movement of said lower mold part and for cutting off the air on the return movement of said part, power means for operating said transfer means, a feeler element mounted for movement with said lower mold part and positioned to explore the face of said upper mold part, and means controlled by engagement of said feeler element with molding material retained on said upper mold part for stopping said power means.

11. A machine for molding articles comprising, in combination, a press having upper and lower mold parts supported therein including means for separating said mold parts, a loading device mounted adjacent said press, means for transferring the lower mold part from said press into loading position in said loading device, power means for operating said transfer means, a feeler element mounted for movement with said lower mold part and positioned to explore the face of said upper mold part, and means controlled by engagement of said feeler element with molding material retained on said upper mold part for stopping said power means.

12. A machine for molding articles comprising, in combination, a press having upper and lower mold parts supported therein including means for separating said mold parts, a loading device mounted adjacent said press, a loading carriage mounted for reciprocation between said press and said loading device, power means for operating said reciprocating loading carriage, a feeler element mounted for movement with said loading carriage and positioned to explore the face of one of said mold parts, and means controlled by engagement of said feeler element with molding material retained on said mold part for stopping said power means.

13. A machine for molding threaded articles comprising, in combination, a press having upper and lower mold parts, one of said parts having screw-threads formed thereon and one part being rotatable, means for separating said mold parts, means operable from a set position to an eject position for rotating said rotatable part to unscrew the molded article from said threaded mold part, a loading device mounted adjacent said press, means for transferring the lower mold part from said press into loading position in said loading device, and means controlled by the operation of said unscrewing means to its eject position for initiating the operation of said transfer means.

14. A machine according to claim 13 and including means controlled by said transfer means in its loading position for effecting return of said unscrewing means to its set position, and means controlled by said unscrewing means in its set position for effecting return of said transfer means into molding position in the press.

15. A machine for molding threaded articles comprising, in combination, a press having upper and lower mold parts, one of said parts having screw-threads formed thereon and one part being rotatable, means for separating said mold parts, means operable from a set position to an eject position for rotating said rotatable part to unscrew the molded article from said threaded mold part, a loading device mounted adjacent said press, a loading carriage mounted for reciprocation between said press and said loading device, means controlled by said unscrewing means in its eject position for effecting movement of said loading carriage into loading position, a feeler element mounted on said carriage and positioned to explore the face of one of said mold parts, and means controlled by engagement of said feeler element with molding material retained on said mold part for stopping said carriage.

16. A machine for molding threaded articles comprising, in combination, a press having upper and lower mold parts, one of said parts having screw-threads formed thereon and one part being rotatable, means for separating said mold parts, means operable from a set position to an eject position for rotating said rotatable part to unscrew the molded article from said threaded mold part, a loading device for said press, means controlled by said unscrewing device in its eject position to initiate operation of said loading device, means controlled by said loading device to effect operation of said unscrewing means to its set position, a timing device, means controlled by said loading device upon completion of a loading operation to effect closing of said press and starting of said timing device, and means controlled by said timing device to open said press after a predetermined time and to simultaneously energize said unscrewing means.

17. A machine for molding threaded articles comprising, in combination, a press having upper and lower mold parts, one of said parts having screw-threads formed thereon and one part being rotatable, means for separating said mold parts, timing means for energizing said separating means to open the mold, means operable in timed relation with the opening of said mold for rotating said rotatable mold part to unscrew the molded article from said threaded mold part, a loading device for said press, means controlled by a predetermined movement of said unscrewing means and by a predetermined opening of said mold for initiating the operation of said loading device, and means controlled by said loading device upon completion of a loading operation to effect closing of said press and starting of said timing means.

18. In a machine for molding screw threaded articles, the combination of a pair of separable mold parts mounted for relative movement into and out of engagement to form the article, operating means for operating one of said mold parts to open and close the mold in a succession of cycles, one of said parts having thread molding means adapted, upon separation of said mold parts, to retain the molded article thereon, a movable frame mounted for movement transversely of said thread molding part, means carried by said frame and being positioned on said frame to frictionally engage the molded article and unscrew the same from said thread molding part, a feeler element carried by said movable frame behind said unscrewing means and arranged to traverse the face of said thread molding part with small clearance, and means controlled by engagement of said feeler element with an article retained on said thread molding part for stopping said operating means.

19. In combination, a molding press having an upper mold plate carrying a plurality of mold elements having threaded engagement with the articles formed in the press, a trackway mounted beneath said mold plate and extending on opposite sides of said press, a carriage movable along said trackway from a position on one side of said press to a position on the opposite side thereof and passing beneath said mold plate, means mounted on said carriage for frictionally engaging the articles on said mold elements and for unscrewing said articles as said carriage is moved beneath said mold plate from one side of said press to the other side thereof, feeler means mounted on said carriage to the rear of said unscrewing means and arranged to traverse the faces of said threaded mold elements with small clearance, and a control element operated by said feeler means upon engagement of said feeler means with an article retained on any of said threaded mold elements.

20. A combination according to claim 19 wherein said threaded mold elements are arranged in a plurality of parallel rows parallel with said trackway, and wherein said feeler means comprises a horizontal bar mounted transversely of said carriage and extending across said rows of threaded mold elements, said bar being pivotally supported on a horizontal axis to be tilted backwardly by engagement with a molded article carried by any of said threaded mold elements.

21. A machine for molding articles comprising, in combination, a press having upper and lower mold parts supported therein including means for separating said mold parts, a loading device mounted adjacent said press, a loading carriage mounted for reciprocation between said press and said loading device, power means for operating said reciprocating loading carriage from a normal position to a position to fill the cavities in the lower mold part, feeler means mounted for movement with the said loading carriage to explore the face of one of said mold parts before said carriage reaches loading position, and means controlled by engagement of said feeler means with molded material retained on said mold parts for stopping said power means and to thereby prevent the filling of said mold cavities.

22. A machine for molding articles from plastic molding material comprising, in combination, a press having relatively movable upper and lower platens, cooperating mold parts carried by said platens including a plurality of heated die elements carried by the lower platen, operating means for operating one of said platens to open and close the press in a succession of cycles, a loading device mounted adjacent said press, a loading carriage mounted for reciprocation between said press and said loading device, means controlled in timed relation with the opening of said press for operating said loading carriage from a normal position to a position to fill the die cavities in the lower platen, feeler means mounted for movement from a position to one side of said platens into a position between said platens to explore the mold parts carried by one of said platens, means operated in timed relation with the operation of said loading carriage for moving said feeler means into exploring position before said loading carriage reaches its loading position, and means controlled by engagement of said feeler means with molded material retained on the mold parts being explored for stopping said press operating means and to thereby prevent the filling of said mold cavities.

23. A machine for molding articles from plastic molding material comprising, in combination, a press having two cooperating mold parts, one of said parts being movable to open and close the mold and at least one mold part being fixed against movement transversely of the press and serving to retain a molded article thereon after each molding operation, means for operating said movable part to open and close said mold in a succession of cycles, said press including a carriage movable transversely of the press adjacent said article-retaining mold part during each molding cycle, a stopping device for said operating means, and means for controlling said stopping device comprising an exploring device mounted upon said carriage and positioned to explore the face of said article-retaining mold part during movement of said carriage.

WILLIAM STRAUSS.